(12) United States Patent
Fleming

(10) Patent No.: US 7,774,626 B2
(45) Date of Patent: Aug. 10, 2010

(54) METHOD TO CONTROL CORE DUTY CYCLES USING LOW POWER MODES

(75) Inventor: Bruce L. Fleming, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 663 days.

(21) Appl. No.: 11/729,792

(22) Filed: Mar. 29, 2007

(65) Prior Publication Data

US 2008/0244285 A1    Oct. 2, 2008

(51) Int. Cl.
G06F 1/26    (2006.01)
G06F 1/32    (2006.01)

(52) U.S. Cl. ............... 713/300; 713/320; 713/324; 327/175

(58) Field of Classification Search ........... 713/300, 713/320, 324; 327/175
See application file for complete search history.

(56) References Cited

U.S. PATENT DOCUMENTS

| | | | |
|---|---|---|---|
| 5,606,713 A | 2/1997 | Wisor et al. | |
| 5,664,205 A | 9/1997 | O'Brien et al. | |
| 5,754,883 A * | 5/1998 | Lim et al. | 710/18 |
| 7,082,542 B2 | 7/2006 | Cooper | |
| 2003/0061526 A1 * | 3/2003 | Hashimoto | 713/320 |
| 2005/0149768 A1 * | 7/2005 | Kwa et al. | 713/300 |

FOREIGN PATENT DOCUMENTS

| | | |
|---|---|---|
| KR | 10-1999-0054607 A1 | 7/1999 |
| WO | 2008/121624 A1 | 10/2008 |

OTHER PUBLICATIONS

International Search Report/Written Opinion for PCT Patent Application No. PCT/US2008/058161, mailed Aug. 22, 2008, pp. 10.

* cited by examiner

*Primary Examiner*—Thomas Lee
*Assistant Examiner*—Michael J Brown
(74) *Attorney, Agent, or Firm*—Cool Patent, P.C.; Joseph P. Curtin

(57) ABSTRACT

A processor starting a duty cycle timer with a specified duty cycle period and a specified power state, and if the duty cycle timer expires, placing the processor in the specified power state in response to the expiry of the timer, if the timer has not expired and if an interrupt other than a timer tick interrupt is received, canceling the duty cycle timer in response to the interrupt other than a timer tick interrupt.

17 Claims, 3 Drawing Sheets

METHOD TO CONTROL CORE DUTY CYCLES USING LOW POWER MODES

BACKGROUND

Low power features of processor based platforms are useful for mobile computing, to increase battery life of devices such as notebook computers, handheld computers, "smart" phones, among many others. Similarly thermal requirements in processor based platforms such as densely packed servers may make it important to control power use in such environments. Power efficiency is important for processor based platforms in general, and therefore features to support lower power use may be incorporated into many different types of platforms. Such features may include, for example, gating or turning off portions of logic, lowering operating frequency, dimming displays, and many others. These features may be incorporated into chipset and processor cores.

Current implementations rely upon stringent control over applications and services that are run on a platform, such as in current mobile handset designs for low-power use. This may not be practical for an open platform that needs to support very long standby times.

The Advanced Configuration and Power Interface (ACPI) specification defines an Operating System (OS) directed power management interface that includes system and device power states, as is well known. The specification is available at www.acpi.info on the World Wide Web.

In typical processor-based platforms, there at least two types of interrupts that may cause a processor to exit an idle or low-power state and become active. The first type of interrupt is caused by various types of timers that may be used by an operating system, as is known in the art. Other types of interrupts are event driven and caused by events, such as an external input event, failure conditions, among many others.

In some processor based platforms the duty cycle of a processor may be varied. For each time slice, the processor may be operated in a fully active mode only for a fraction of the time in the time slice, and be idled for the remainder of the time in the time slice. This fraction is termed a duty cycle.

DETAILED DESCRIPTION

In some embodiments a processor based platform includes a hardware component which may be referred to as a Duty Cycle Timer (DCT). This component may be incorporated into a chipset as part of the power management functionality of the processor, or directly into the processor itself, or in some other hardware component of the platform.

Figure 1:
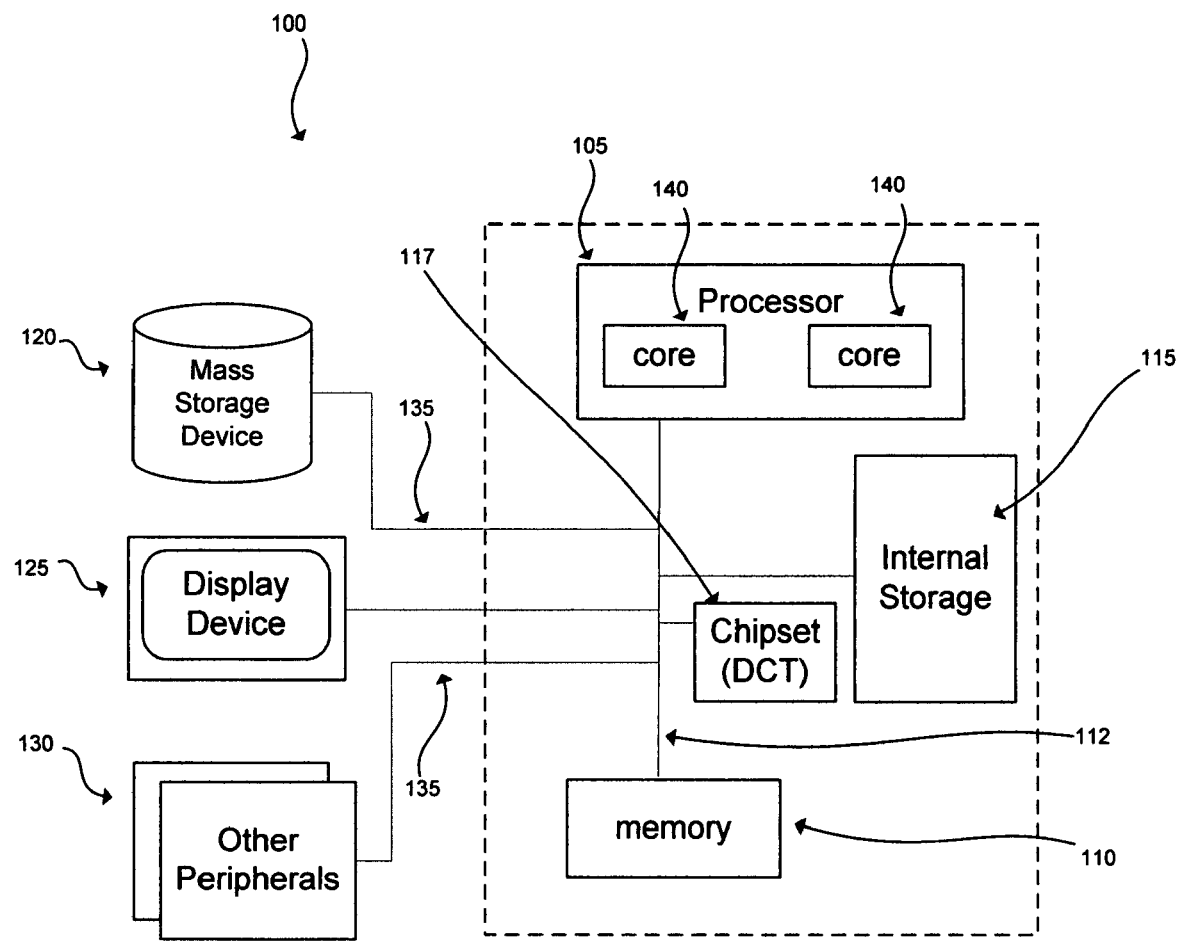
FIG. 1 depicts a processor based system in one embodiment.

FIG. 1 depicts a processor-based system or platform 100 incorporating a duty cycle timer as part of a chipset of the processor. The system 100 consists of a processor 105 with two cores 140. The processor is connected to internal storage, such as a disk drive system 115 and a memory 110, by one or more buses in an internal bus system 112. The internal bus system is also interconnected to an external bus or buses 135 that may connect to peripherals, such as an external display device 125, external mass storage devices, such as a CDROM or DVD-RW device 120, and other peripherals 130.

Many different embodiments of a processor-based system like the one depicted in FIG. 1 are possible. In some embodiments, there may be more or less than two cores present in processor 105. Specifically, the processor in some embodiments may be a single-core processor. In yet other embodiments, a multi-processor system may be used with a cache system that allows threads executing on each of the processors concurrent shared access to the cache. The specific organization of the memory, storage, and peripherals in some embodiments may differ. In some embodiments, certain peripherals may be omitted, or the system may include other interfaces not shown in the Figure, such as network connectors, audio I/O and many others. Many other embodiments may be employed as would be appreciated by the artisan.

The platform depicted in FIG. 1 includes a chipset 117 also connected to the bus 135, which may control features or functionality of the platform including power-management functionality. In this embodiment the chipset may incorporate a Duty Cycle Timer (DCT). In general the DCT logic is to manage the duty cycle of the processor of the platform in response to power-management requirements, interrupts, thermal events, among other parameters.

Figure 2:
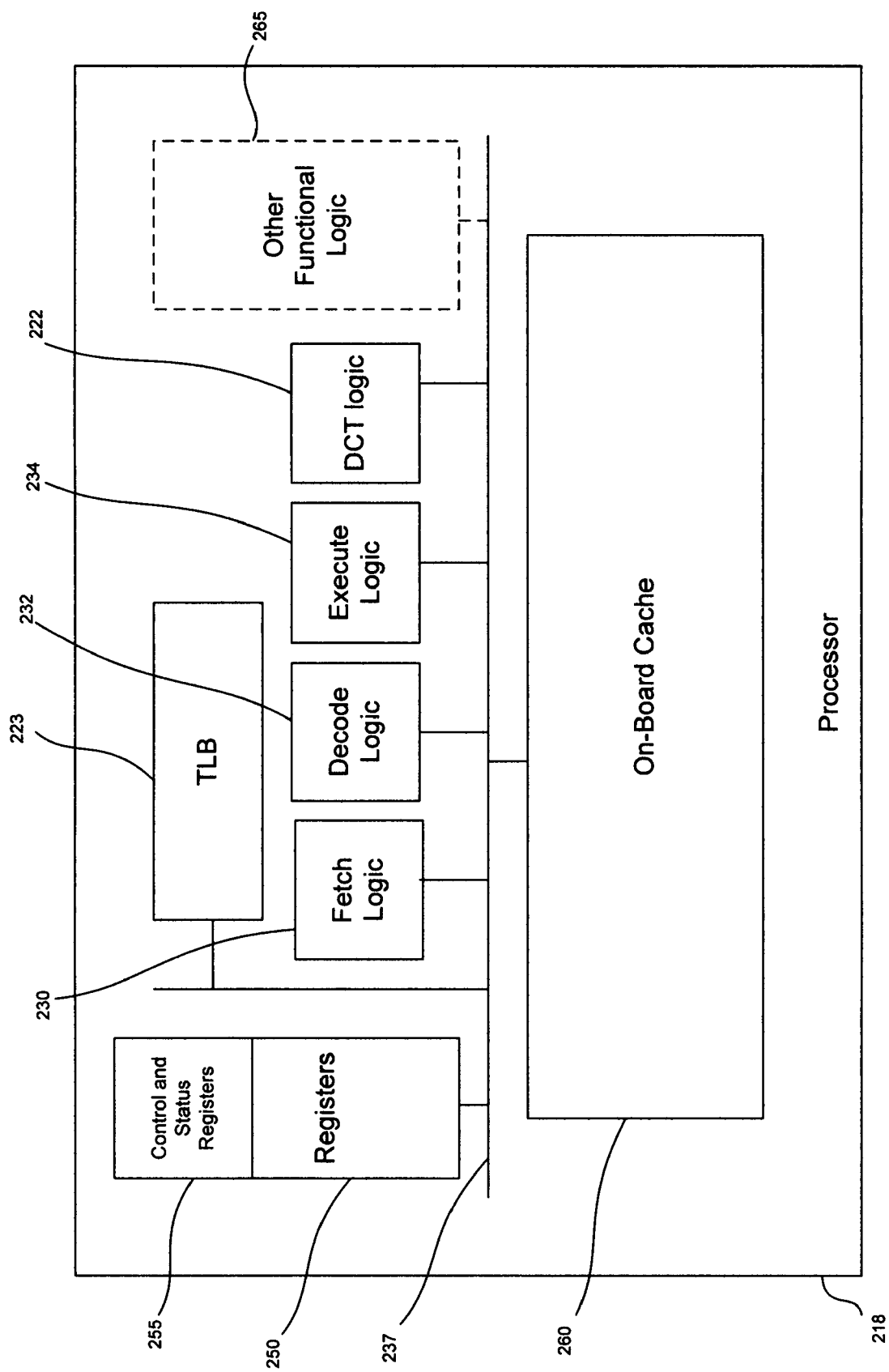
FIG. 2 depicts a processor in one embodiment.

FIG. 2 depicts at a high level some block-level features of processor 218 in the embodiment of FIG. 2. In general, a processor such as the one depicted in FIG. 2 at 218 may include a processor bus or buses, such as the one indicated at 237 in FIG. 2a. Furthermore, as depicted in FIG. 2, a processor may include registers 250 in one or multiple banks, and each register may have the capacity to store 32, 64, 128 or another number of bits of data as is known. Each register bank may further have several registers, such as e.g., 8, 32, 64 registers. Some registers may be dedicated to control and status use for example to store the CR bits as in an x86 embodiment. In other embodiments, other control registers and flags may be stored in the processor to allow different modes of operation and status checking as is known in the art. In general, a processor such as the one depicted in the embodiment of FIG. 2 would include logic or logic circuitry 230 to fetch instructions and data from memory, cache or other storage; logic or logic circuitry to decode instructions and execution units, such as 234 to perform the instructions. Many variations on these functional units are possible, e.g., execution in the execution unit may be pipelined; or include speculation, and branch prediction; or have other features as related to a particular processor or application. Other functional logic 265 may be present in the processor, such as logic for arithmetic, graphics processing, and many other specific functions of the processor as is known. An on-board cache 260 may be present in some embodiments. This cache may have various sizes, such as 128 MB, 1 GB, etc. as is known. As previously indicated with reference to FIG. 2, the processor 218 includes a duty cycle timer (DCT) unit or logic circuit 222. As discussed with reference to FIG. 1, the DCT logic is generally to manage the duty cycle of the processor of platform in response to power-management requirements, interrupts, thermal events, among other parameters.

In each of the above discussed embodiments, the DCT may be used in conjunction with an instruction of the processor, which defines the desired duty cycle of the core for a specific time slice. During normal usage, processor-based systems may occasionally enter a grossly idle state. In this embodiment, the entry into the grossly idle state would cause the DCT embodied in either the power-management logic of the system or chipset 117 of the embodiment depicted in FIG. 1, or in the processor logic 222 depicted in FIG. 2, to cause the system to use a low-power core state. In a system that follows the ACPI protocol, this state may be the C6 state as defined in the ACPI specification. In general, interrupts could bring the processor out of this low-power mode. A common source of such interrupts would be a timer tick in such a grossly idle system. The new instruction would be used upon the detection of a timer tick received while the core was in the lowest-state retentive power mode. The instruction would indicate the desired duty cycle of the core, and the core power mode to be entered once the duty cycle was consumed. The instruction may then cause the DCT to be armed and start ticking. If the active threads are executing when the duty cycle expires, the power-management facilities of the system would halt the core and force the core and system into the specified state, such as a C6 state in an ACPI-compliant system or its equivalent in others. Upon the next timer tick interrupt, which would bring the system out of the forced low-power state, it would appear to the OS and any executing thread that it had consumed the entire quantum and would likely be pushed to the end of the reschedule queue. If the operating system indicates an idle condition prior to the duty cycle being consumed, the power-management code in the OS could request moving to a new low-power mode. The action of requesting to move to the new low-power mode would cancel the DCT.

In some embodiments, DCT logic may enable a platform to quickly adapt to a non-idle, or attended workload. This type of workload in general may require an external event to cause the transition. This external event may be in the form of user input such as a keyboard event, mouse event, touch screen input, speech reception, among many others, a power-management event, such as a change to a less efficient and higher performance mode, for one example, or a network-driven event, such as a voice call, a push upgrade, or push email. In this case, any interrupt source that is not a timer interrupt may then cancel any previously instantiated duty cycle timer. Once the DCT is cancelled, the processor may now allow time-sensitive threads or processes, such as driver and interrupt code, to execute to completion. Unlike driver and external interrupt handlers, timer tick interrupt or period-timer-based threads typically do not have rigid time deadlines to complete, but rather a fixed set of functions that are desired to be completed on a synchronous fashion and so may be delayed or preempted to the following scheduling quantum of the OS.

Figure 3:
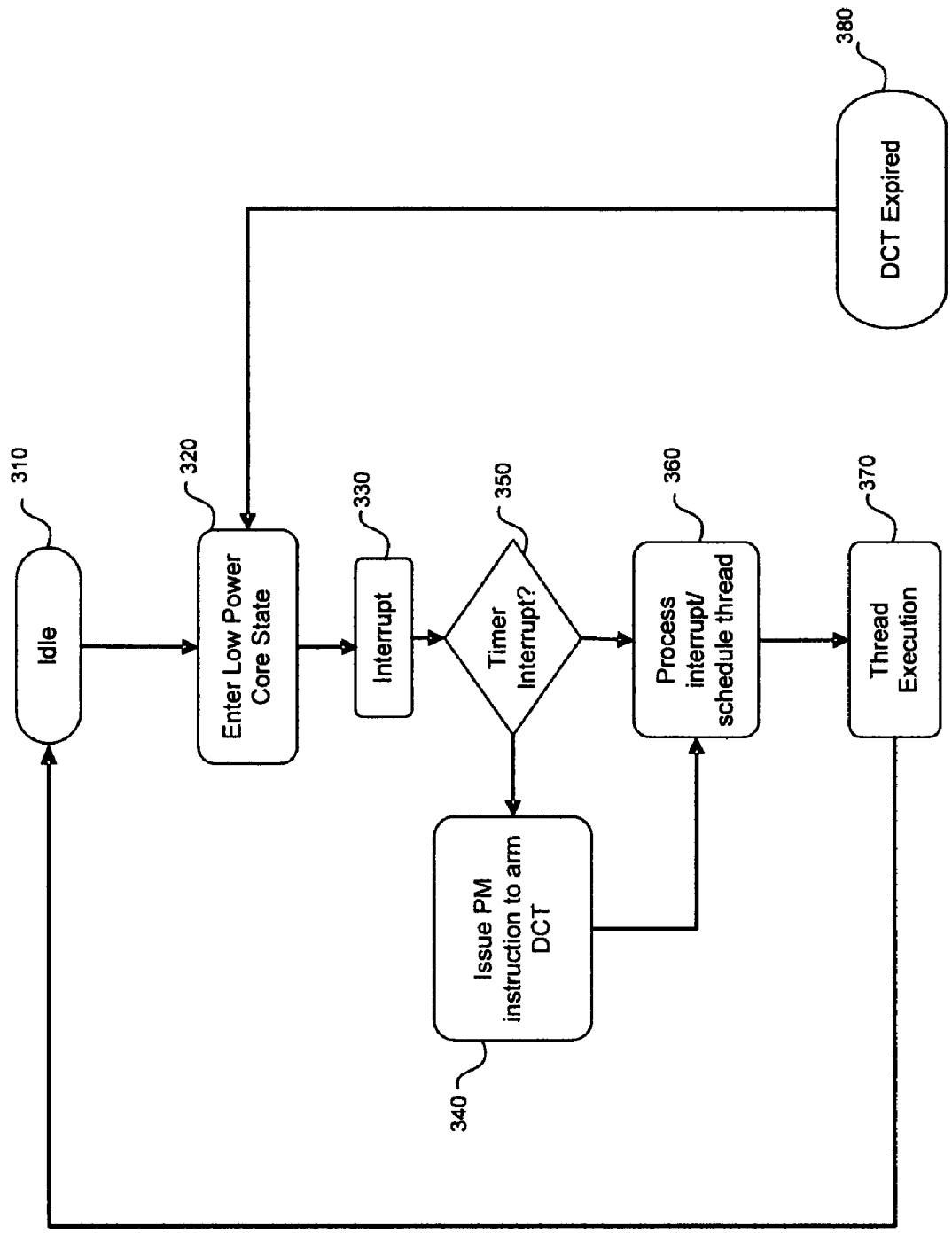
FIG. 3 depicts the flow of processing in one embodiment.

The functionality of DCT logic, as embodied either in platform hardware or in processor hardware, is depicted in FIG. 3. In the figure, processing within the DCT logic circuit is depicted at a high level. The relevant processing begins in an idle state of a processor-based system 310. Power-management logic may then place the system in a low-power consuming state, such as for example C6 in an ACPI-compliant platform, 320. An interrupt may then arrive 330. If the interrupt is a standard period or timer interrupt 350, the power-management instruction is issued to arm the DCT and to specify the low-power core state for the core to enter upon DCT expiry, at 350-340. Otherwise, the interrupt is processed without a DCT arming, 350-360. If the interrupt was a timer interrupt, the interrupt is still processed along path 340-360, but is subject to interruption and idling by the DCT timer expiration event 380. The thread handling the interrupt then continues execution in either scenario 370.

When the DCT expires, 380, it forces the system into the specified low-power state and processing returns to the state at 320.

In some embodiments, the DCT may also be used for active thermal management on a platform. Thermal sensors may in these embodiments be used as input into a policy that may continually change the duty cycle of the core. This may in some embodiments provide quicker dissipation of heat due to the ability to substantially affect the average power consumption (and associated thermal generation) of the platform.

The use of the DCT in embodiments provides a low overhead capability to maintain high granularity control over the duty cycle and subsequent average standby power of the platform. The DCT allows the platform to adapt to the idle characteristics of the platform and without significantly affecting standby and battery life requirements. The mechanism also provides for time critical execution as well as deferred execution of threads to completion once the platform is in an active state.

It should be noted than many variations on the above described embodiments are possible. DCT logic may be incorporated into different components in different platforms, e.g., in the chipset, in the processor, in BIOS firmware, among others. The actual power states available to a platform for the idle state specified after timer expiration may depend on the platform. States other than ACPI states may be used in non-ACPI-compliant systems. Many variations of the logical organization of the system of FIG. 1 and the processor of FIG. 2 are possible. The flowchart of FIG. 3 is at a high level and may be implemented in a very large variety of different ways in logic circuits, microcode, or in programs embedded in firmware and may be downloadable from a medium such as a disk or other storage.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. A method, comprising:
   starting a duty cycle timer by a processor with a specified duty cycle period and a specified power state, the specified duty cycle period comprising a first period in which the processor is a fully active condition and a second period in which the processor is in an idled condition;
   if the duty cycle timer expires, placing the processor in the specified power state in response to the expiry of the duty cycle timer;
   if the duty cycle timer has not expired and if an interrupt other than a timer tick interrupt is received, cancelling the duty cycle timer in response to the interrupt other than a timer tick interrupt; and
   cancelling the duty cycle timer by the processor in response to an indication of the idled condition being received by the processor.

2. The method of claim 1, further comprising:
   executing an instruction by the processor to start the duty cycle timer of the processor.

3. The method of claim 2, further comprising:
   starting the duty cycle timer by the processor in response to receiving a timer tick interrupt in a low-power state.

4. The method of claim 1, further comprising:
   starting the duty cycle timer by the processor in response to receiving a timer tick interrupt in a low-power state.

5. The method of claim 4, wherein
   the duty cycle timer is incorporated into logic circuits of the processor.

6. The method of claim 4, wherein:
   the processor and the duty cycle timer are hardware components of a process-based platform.

7. The method of claim 1, further comprising:
   starting the duty cycle timer by the processor in response to detecting a change of thermal state of the processor to a state outside a specified range of thermal states; and
   canceling the duty cycle in response to the thermal state of the processor returning to a state within the specified range of thermal states.

8. A processor, comprising:
   a processor bus;
   fetch logic to receive an instruction and to receive an operand;
   decode logic to decode the instruction; and
   a logic circuit to perform, at least in part in response to the decoding of the instruction,
   starting a duty cycle timer with a specified duty cycle period and a specified power state, the specified duty cycle period comprising a first period which the processor is a fully active condition and a second period in which the processor is in an idled condition;
   if the duty cycle timer expires, placing the processor in the specified power state in response to the expiry of the duty cycle timer;
   if the duty cycle timer has not expired and if an interrupt other than a timer tick interrupt is received, cancelling the duty cycle timer in response to the interrupt other than a timer tick interrupt; and
   cancelling the duty cycle timer in response to an indication of the idled condition being received by the processor.

9. The processor of claim 8, wherein the logic circuit comprises a logic circuit operating at least in part based on microcode instructions.

10. The processor of claim 9, wherein:
    the logic circuit is further to perform starting the duty cycle timer in response to receiving a timer tick interrupt in a low-power state.

11. The processor of claim 8, wherein:
    The logic circuit further performs starting the duty cycle timer in response to receiving a timer tick interrupt in a low-power state.

12. The processor of claim 11, wherein:
    the processor is an x86 processor; and
    the specified power state is an ACPI power state.

13. The processor of claim 12, wherein:
    the instruction is based at least in part on an MWAIT instruction; and
    the specified power state is a C6 power state.

14. The processor of claim 8, wherein:
the logic circuit further performs starting the duty cycle timer in response to detecting a change of thermal state of the processor to a state outside a specified range of thermal states; and
performst canceling the duty cycle in response to the thermal state of the processor returning to a state within the specified range of thermal states.

15. A platform, comprising:
a processor;
a memory;
a bus interconnecting the processor and the memory;
the processor further comprising:
a processor bus;
fetch logic to receive an instruction and to receive an operand;
decode logic to decode the instruction; and
a logic circuit to perform, at least in part in response to the decoding of the instruction,
starting a duty cycle timer with a specified duty cycle period and a specified power state, the specified duty cycle period comprising a first period which the processor is a fully active condition and a second period in which the processor is in an idled condition;
if the duty cycle timer expires, placing the processor in the specified power state in response to the expiry of the duty cycle timer;
if the duty cycle timer has not expired and if an interrupt other than a timer tick interrupt is received, cancelling the duty; and
cancelling the duty cycle timer in response to an indication of the idled condition being received by the processor.

16. The platform of claim 15, wherein:
the logic circuit further performs starting the duty cycle timer in response to receiving a timer tick interrupt in a low-power state.

17. The platform of claim 15, wherein:
the logic circuit further performs starting the duty cycle timer in response to detecting a change of thermal state of the processor or system; and
performs canceling the duty cycle in response to the thermal state of the processor returning to a state within the specified range of thermal states.

* * * * *